United States Patent [19]
Hartick et al.

[11] Patent Number: 5,769,323
[45] Date of Patent: Jun. 23, 1998

[54] HEADLAMP CLEANING SYSTEM FOR A MOTOR VEHICLE

[75] Inventors: Ulrike Hartick, Böblingen; Siegmund Czesnikowski, Jettingen, both of Germany

[73] Assignee: Mercedes-Benz AG, Stuttgart, Germany

[21] Appl. No.: 509,014

[22] Filed: Jul. 31, 1995

[30] Foreign Application Priority Data

Jul. 29, 1994 [DE] Germany .......................... 44 26 878.5

[51] Int. Cl.⁶ ...................................................... B05B 1/10
[52] U.S. Cl. ................................... 239/284.2; 296/96.15; 15/250.01
[58] Field of Search .............................. 239/284.1, 284.2, 239/255, 203, 204, 205; 296/96.15, 194; 15/250.002, 250.01

[56] References Cited

U.S. PATENT DOCUMENTS 5,242,114  9/1993  Camier et al. ........................ 239/284.2
5,269,464  12/1993  Epple et al. .......................... 239/284.2

FOREIGN PATENT DOCUMENTS

| 0 508 853 | 3/1995 | European Pat. Off. . |
| 2 666 777 | 3/1992 | France . |
| 2710016 A | 3/1995 | France . |
| 4121316 | 1/1992 | Germany .............................. 239/284.2 |
| 41 30 892 | 3/1992 | Germany . |
| 9309852 U | 8/1993 | Germany . |
| 2 133 719 | 8/1984 | United Kingdom . |

*Primary Examiner*—Andres Kashnikow
*Assistant Examiner*—Lisa Ann Douglas
*Attorney, Agent, or Firm*—Evenson, McKeown, Edwards & Lenahan, P.L.L.C.

[57] ABSTRACT

A headlamp cleaning arrangement for a motor vehicle has a telescopically extendable nozzle which extends through an opening in the outer wall of the motor vehicle in an area near the headlamp. The opening in the outer wall has a cover which is pivotably mounted near a lower rim of the opening in the outer wall and is held in a closed position by a spring arrangement. When the nozzle arrangement is extending into its operative position to clean the headlamp, the nozzle arrangement pushes the cover, causing it to pivot open.

20 Claims, 3 Drawing Sheets

HEADLAMP CLEANING SYSTEM FOR A MOTOR VEHICLE

BACKGROUND AND SUMMARY OF THE INVENTION

The invention relates to a headlamp cleaning system for a motor vehicle, and more particularly to a headlamp cleaning system with a nozzle arrangement which is extendable through an opening in an outer wall of the motor vehicle telescopically into an operating position and is fastened to a headlamp casing. A headlamp cleaning system for a motor vehicle is known from European Patent Document EP 0 508 853 A1, which is provided with a nozzle arrangement arranged in the region of the headlamp casing. The head of the nozzle arrangement is provided with a cover cap, which, in a rest position of the nozzle arrangement, closes off the pass through opening in the outer wall of the motor vehicle. In the known headlamp cleaning system, the outer wall of the motor vehicle is formed around the pass-through opening in the nozzle arrangement by a lens of the headlamp. Accordingly, for visual reasons, the cover cap is made from the material of the lens. It is also known to arrange the nozzle arrangement of a headlamp cleaning system fixed to the vehicle body beneath a headlamp, the cover of the opening in the outer wall of the motor vehicle being fastened to the nozzle head and painted in the color of the outer wall. The adjustment of the fit between the cover and the outer wall of the motor vehicle is complex an difficult. The object of the invention is to provide a headlamp cleaning system of the above-mentioned type, which is simple to fit and fits in an aesthetically pleasing manner into the outer wall of the motor vehicle. This object has been achieved according to the present invention by providing a cover which is pivotably mounted in the region of a rim of the opening in the outer wall and is held by means of a spring arrangement in its closed position when the nozzle arrangement is in a non-operative rest position.

Because the cover is arranged fixed to the body in the region of the outer wall, this enables the cover to be painted, in contrast to the prior art, together with the corresponding body parts, whereby no color variations arise between the cover and the outer wall. As a result of the pivotable mounting on the outer wall, the advantage is additionally obtained that the cover can always be consistently positioned in the opening for the passage of the nozzle arrangement such that it is flush with the outer wall, since it is not fastened to the nozzle arrangement. This is particularly advantageous in comparison to the prior art, in which a complex adjustment of the nozzle arrangement was necessary in the fitting of the headlamp cleaning system in order to obtain an exact alignment between the cover cap, connected rigidly to the nozzle arrangement, and the outer wall. In addition, by virtue of the spring arrangement, the cover is automatically held in a closed position when the nozzle arrangement is in a nonoperative position. However, when the nozzle arrangement presses against the cover from within when the said nozzle is being extended into its operating position, the spring force of the spring arrangement is overcome and the cover is forced to rotate outwards by the nozzle arrangement.

In an embodiment of the invention, the nozzle arrangement is fastened by means of a latch connection to the headlamp casing. It is thereby possible to clip the nozzle in a simple fashion to the headlamp casing, whereby the headlamp cleaning system can be pre-fitted together with the headlamp and can then be inserted into the motor vehicle. In a further embodiment of the invention, the cover is held by means of a spring-loaded hinge against the rim of the opening, a hinge axle of the cover being arranged transversely to the direction of extension of the nozzle arrangement and at a region, lying opposite the headlamp, of the rim of the opening.

These and other objects, features and advantages of the present invention will become more readily apparent from the following detailed description when taken in conjunction with the accompanying drawings.

DETAILED DESCRIPTION OF THE DRAWINGS

Figure 1:
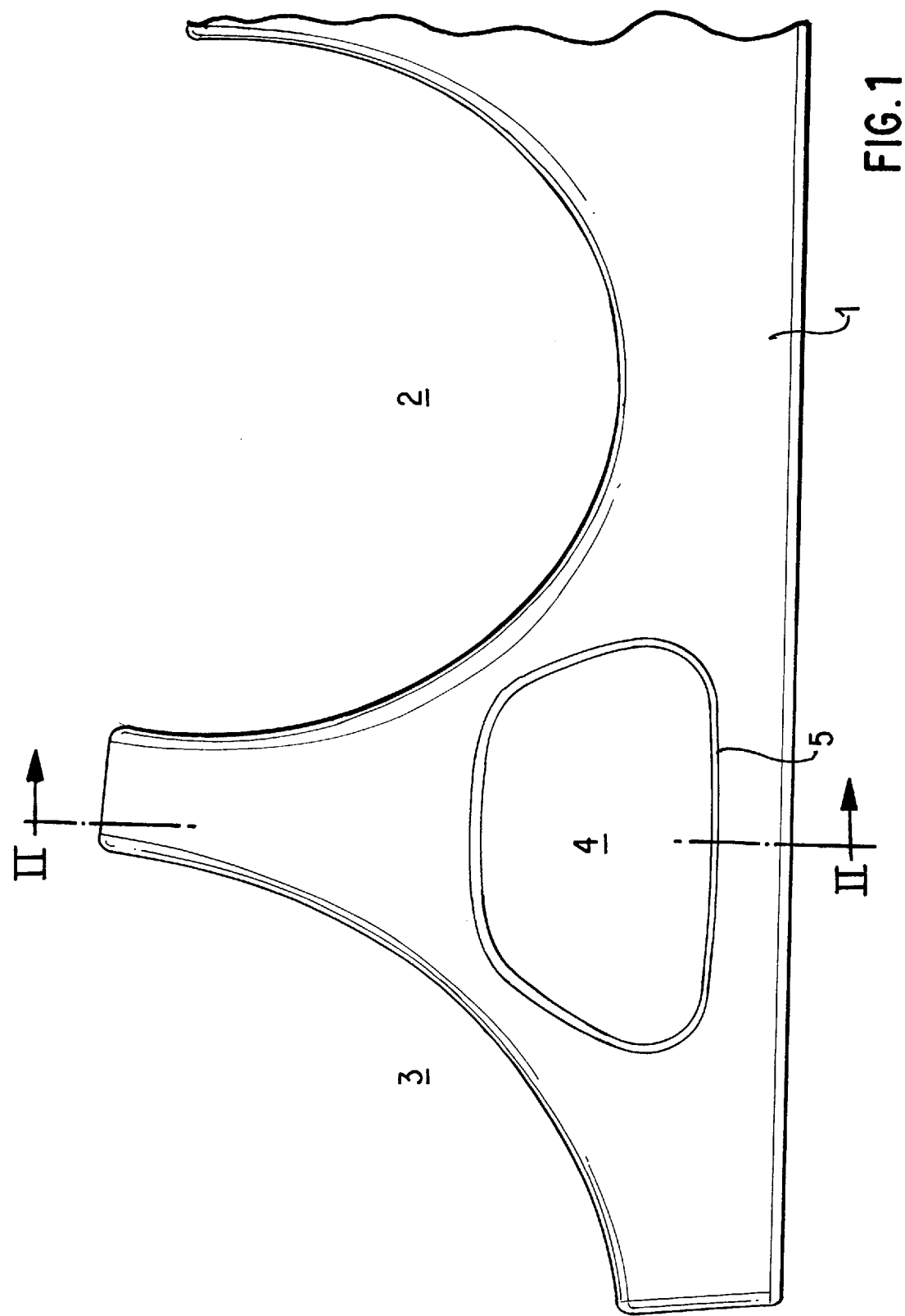
FIG. 1 shows a partial front view of, a screen for a double headlamp of a passenger vehicle, which screen is provided with a passage for a nozzle arrangement of an embodiment of a headlamp cleaning system according to the present invention.

A front region of a passenger vehicle is provided, at the level of the front headlamp arrangement, with a wall (1) constituting the outer wall of the passenger vehicle in this region, which wall is provided with two headlamp cut-outs (2 and 3) for two headlamps (8). Between the cut-outs (2 and 3) for the two headlamps (8) there is provided in the wall (1) a passage (6) (FIG. 2) for a telescopically extendable nozzle arrangement (7) of a headlamp cleaning system. The nozzle arrangement (7) serves to clean a lens of the headlamp (8), which headlamp is provided in the region of the cut-out (2) of the wall (1). For this reason, the nozzle head of the nozzle arrangement (7) extends in the direction of the cutout (2). The nozzle arrangement (7) is fastened to a bottom side of a headlamp casing (9) of the headlamp (8). The headlamp casing (9) includes, in the region of a rear side of the nozzle arrangement (7), a holding flange (10) in which the casing of the nozzle arrangement (7) is inserted. A front region of the casing of the nozzle arrangement (7) is suspended from the bottom side of the headlamp casing (9) by means of a latch connection (11), a corresponding latch pin of the casing of the nozzle arrangement (7) being clipped, in a simple fashion, to a corresponding latch point on the headlamp casing (9).

Figure 2:
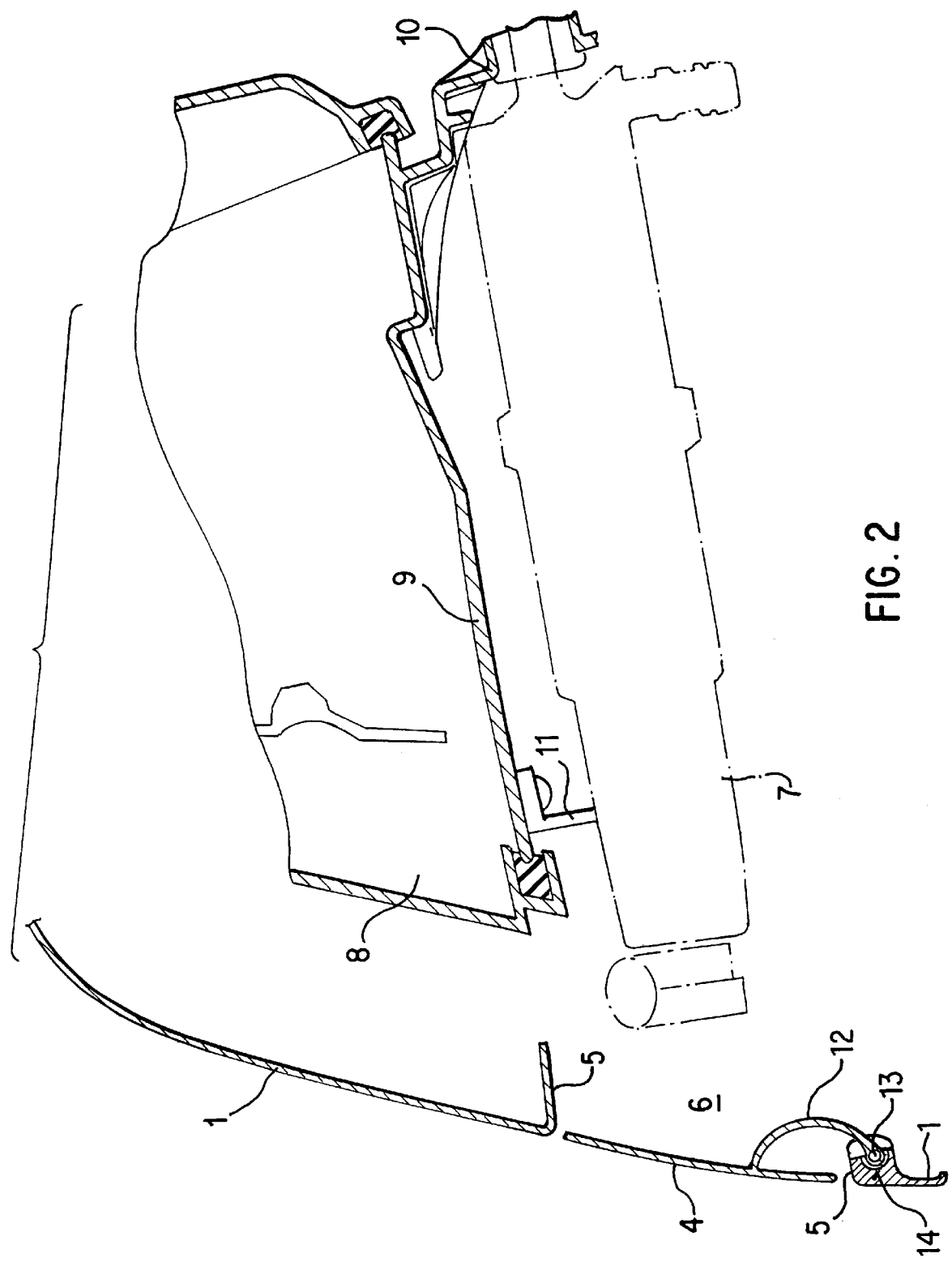
FIG. 2 shows a sectional side view of the front region of a passenger vehicle, having a screen according to FIG. 1, along the section line II—II in FIG. 1, the cover for the passage of the nozzle arrangement being pivotably mounted on a lower rim of the passage.
Figure 3:
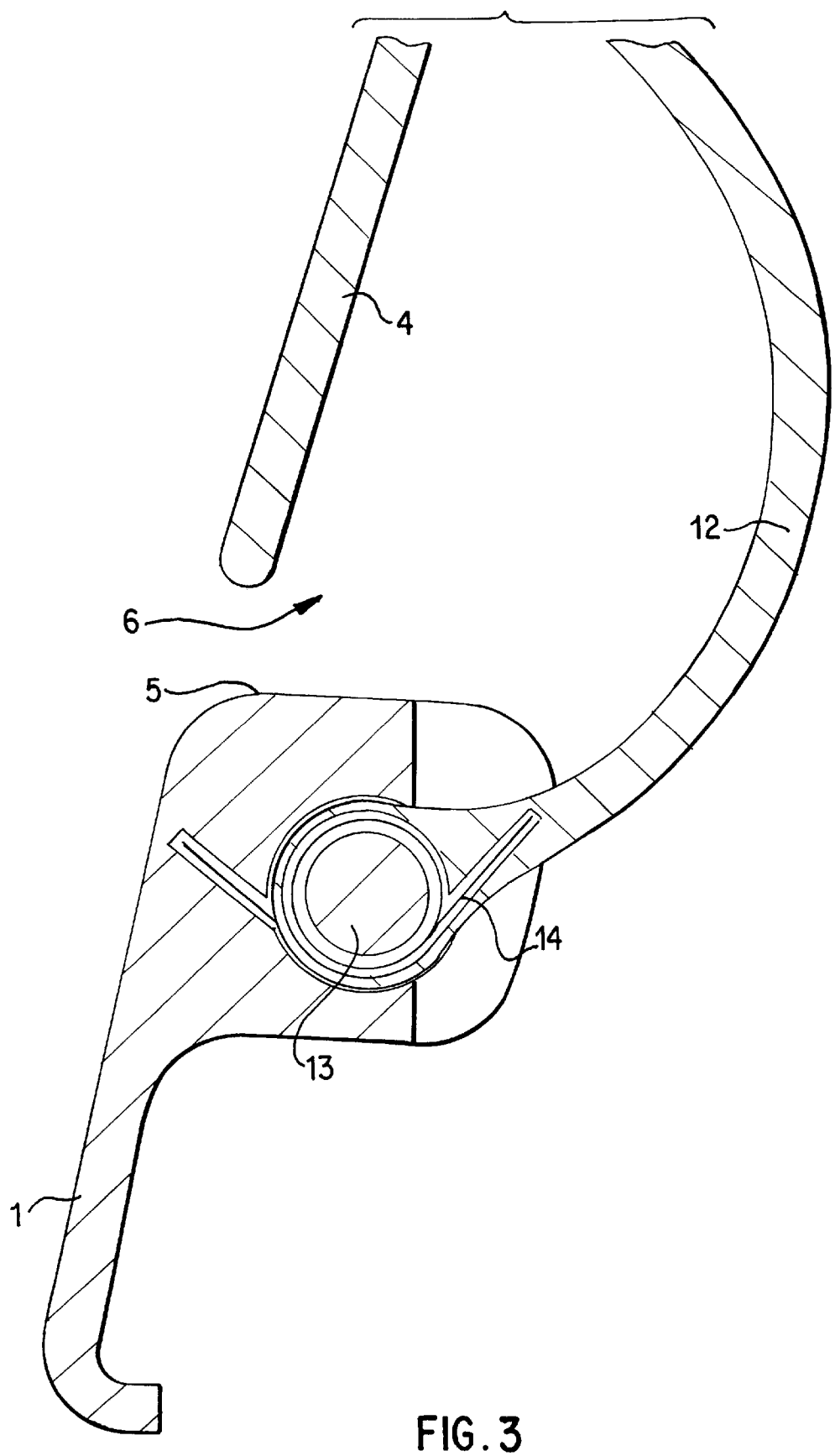
FIG. 3 shows an enlarged sectional view of the pivotable mounting of the cover shown in FIG. 2.

In a non-operative rest position, represented in FIG. 2, of the nozzle arrangement (7), the nozzle arrangement is located within the outer wall of the passenger vehicle, i.e. inside the wall (1). In this non-operative rest position of the nozzle arrangement (7), the passage (6) is closed off by a cover in the form of a thin cover cap (4) which is aligned flush with the outer side of the wall (1) and is fitted into a rim (5) surrounding the passage (6) in the wall (1). The cover cap (4) is provided with a hinged web (12), which is curved in the style of an arc and is pivotably mounted in the region of a hinge axle (13), which is arranged transversely to the direction of extension of nozzle arrangement (7) beneath the passage (6). The cover cap (4) is spring-loaded by a spring arrangement in the form of a torsion spring (14), the torsion spring (14) acting upon the hinged web (12) of the cover cap (4), in the region of the hinge axle (13), such that the cover cap (4) is held by the spring force of the torsion spring (14)

in the position which closes off the passage (6). The closed-off position of the cover cap (4) is defined by stop webs (not represented in the drawings) in the region of the rim (5) of the screen (1). As soon as the nozzle arrangement (7) extends outwards through the passage (6) into its operating position, the head of the nozzle arrangement (7) presses against the inner side of the cover cap (4) and pivots the cover cap outwards and downwards, counter to the spring force of the torsion spring (14). Upon further extension of the nozzle arrangement (7), the head of the nozzle arrangement (7) slides along the inner side of the cover cap (4), whereby the cover cap (4) is pivoted forcibly further outwards and downwards. The spring force of the torsion spring (14) is adjusted, of course, such that, in a rest position of the nozzle arrangement (7), a satisfactory seat for the cover cap (4) in its closed-off position is guaranteed, which seat also prevents clattering when driving, but such that pressure exerted by the extending nozzle arrangement (7) against the cover cap (4) produces a pivoting of the cover cap (4) without any significant resistance. This is necessary so as not to impair the functioning of the nozzle arrangement (7). As soon as the nozzle arrangement (7) retracts into its non-operative rest position again, the cover cap (4), as a result of the spring force of the torsion spring (14), pivots automatically back into its closed-off position.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A headlamp cleaning system for a motor vehicle, having a nozzle arrangement which is movable through an opening in an outer wall of a motor vehicle from a non-operative position into an operative position and which is fastened to a headlamp casing, wherein the opening in the outer wall is closed by a cover when the nozzle arrangement is in the non-operative position, and wherein the cover is pivotably mounted proximate a rim of the opening in the outer wall and is held in a closed position by a spring arrangement when the nozzle arrangement is in the non-operative position.

2. A headlamp cleaning system according to claim 1, wherein the nozzle arrangement is fastened to the headlamp casing with a latch connection.

3. A headlamp cleaning system according to claim 1, wherein the nozzle arrangement is fastened to the headlamp casing with a latch connection.

4. A headlamp cleaning system according to claim 3, wherein the nozzle arrangement is additionally fastened to the headlamp casing via a holding flange integral with said headlamp casing.

5. A headlamp cleaning system according to claim 1, wherein the nozzles arrangement is telescopically extendable through the opening in the outer wall of the motor.

6. A headlamp cleaning system according to claim 1, wherein the cover is pivotably mounted directly on said outer wall.

7. A headlamp cleaning system according to claim 1, wherein said outer wall is provided with at least one cut-out for a headlamp, and wherein said opening is arranged proximate said at least one cut-out.

8. A headlamp cleaning system according to claim 1, wherein the nozzle arrangement is fastened to the headlamp casing via a holding flange integral with said headlamp casing.

9. A headlamp cleaning system according to claim 1, wherein the nozzle arrangement is fastened to a bottom side of the headlamp casing.

10. A headlamp cleaning system according to claim 1, wherein said nozzle arrangement is movable along a longitudinal course which is generally parallel to a longitudinal course of the motor vehicle.

11. A headlamp cleaning system according to claim 1, wherein said opening in the outer wall of the motor vehicle faces a forward driving direction of the motor vehicle.

12. A headlamp cleaning system for a motor vehicle, having a nozzle arrangement which is movable through an opening in an outer wall of a motor vehicle from a non-operative position into an operative position and which is fastened to a headlamp casing, wherein the opening in the outer wall is closed by a cover when the nozzle arrangement is in the non-operative position, and wherein the cover is pivotably mounted proximate a rim of the opening in the outer wall and is held in a closed position by a spring arrangement when the nozzle arrangement is in the non-operative position, wherein said spring arrangement comprises a spring-loaded hinge which holds the cover against the rim of the opening.

13. A headlamp cleaning system according to claim 8, wherein an axle of the hinge is arranged transversely to the direction of movement of the nozzle arrangement and at a lower region of the rim of the opening.

14. A headlamp cleaning system according to claim 13, wherein the cover is pivotably mounted on said outer wall.

15. A headlamp cleaning system for a motor vehicle, having a nozzle arrangement which is movable through an opening in an outer wall of a motor vehicle from a non-operative position into an operative position, wherein the opening in the outer wall is closed by a cover when the nozzle arrangement is in the non-operative position, wherein the cover is pivotably mounted proximate a rim of the opening in the outer wall and is held in a closed position by a spring arrangement when the nozzle arrangement is in the non-operative position, and wherein the cover is held against the rim of the opening by a spring-loaded hinge, an axle of the hinge being arranged transversely to the direction of movement of the nozzle arrangement and at a lower region of the rim of the opening.

16. A headlamp cleaning system according to claim 15, wherein the nozzle arrangement is telescopically extendable through the opening in the outer wall of the motor vehicle.

17. A headlamp cleaning system according to claim 15, wherein said nozzle arrangement is movable along a longitudinal course which is generally parallel to a longitudinal course of the motor vehicle.

18. A headlamp cleaning system according to claim 15, wherein said opening in the outer wall of the motor vehicle faces a forward driving direction of the motor vehicle.

19. A headlamp cleaning system according to claim 15, wherein the cover is pivotably mounted on said outer wall.

20. A headlamp cleaning system according to claim 15, wherein said outer wall is provided with at least one cut-out for a headlamp, and wherein said opening is arranged proximate said at least one cut-out.

* * * * *